Aug. 12, 1969 R. L. VOLLER 3,461,015
METHOD FOR FORMING A FLEXIBLE PLASTIC BAG
HAVING AN INTEGRAL VALVE
Original Filed Dec. 2, 1963 2 Sheets-Sheet 2
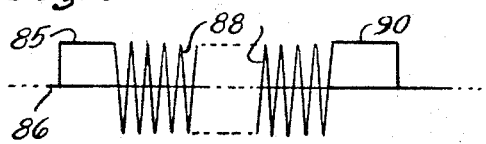
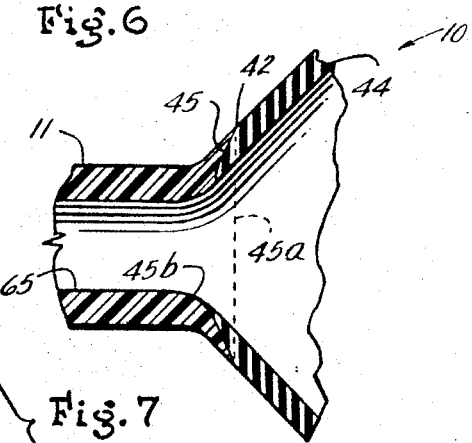
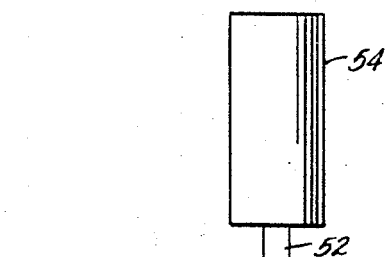
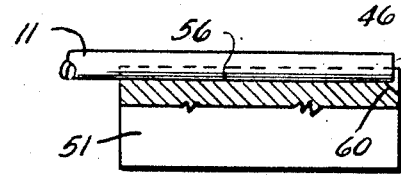
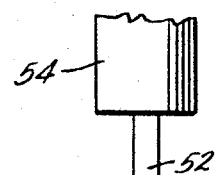
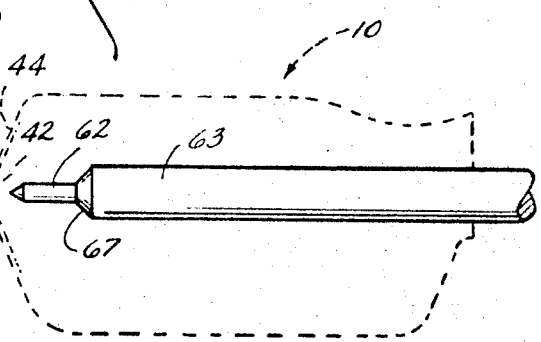
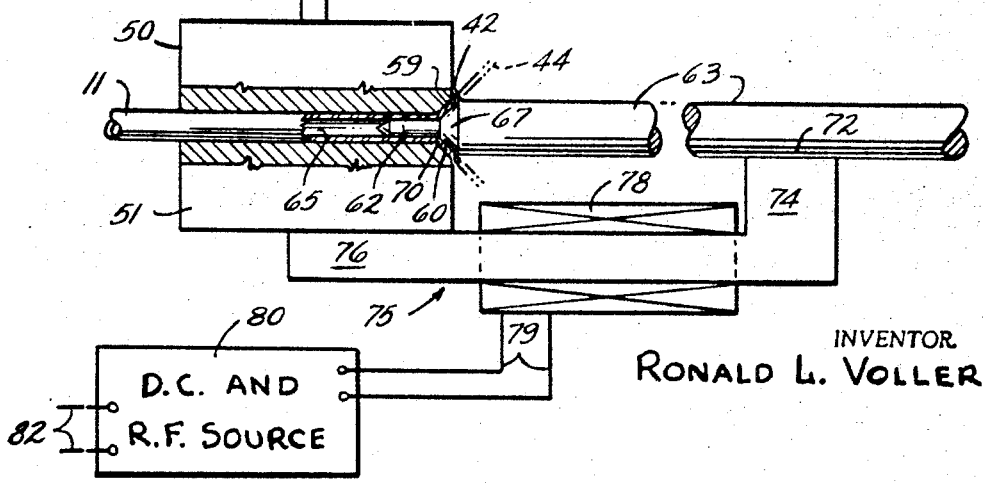
INVENTOR.
RONALD L. VOLLER

United States Patent Office 3,461,015
Patented Aug. 12, 1969

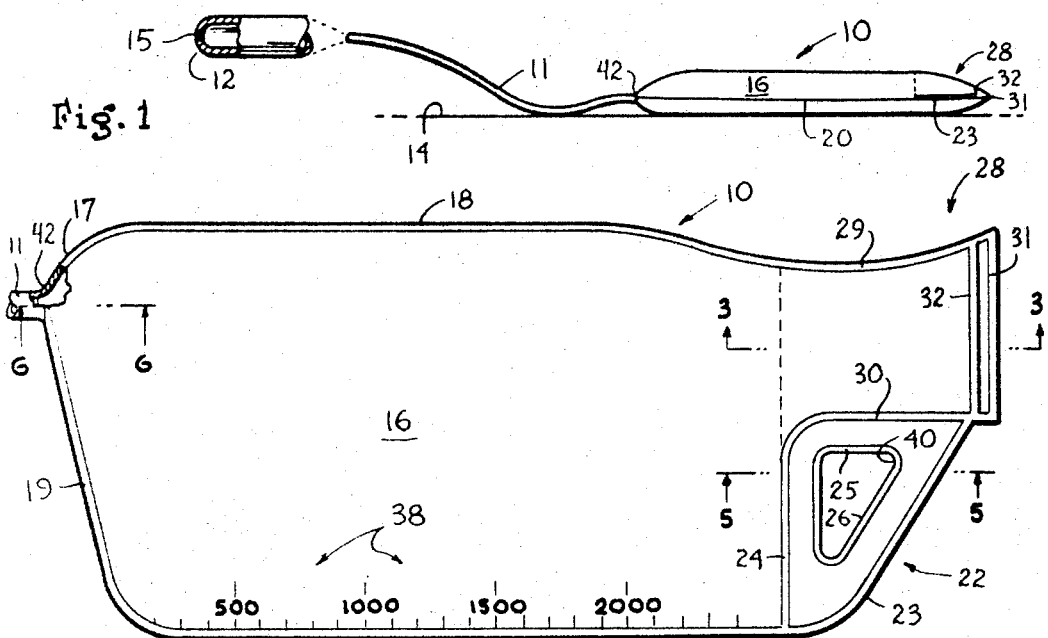
Fig. 1
Fig. 2
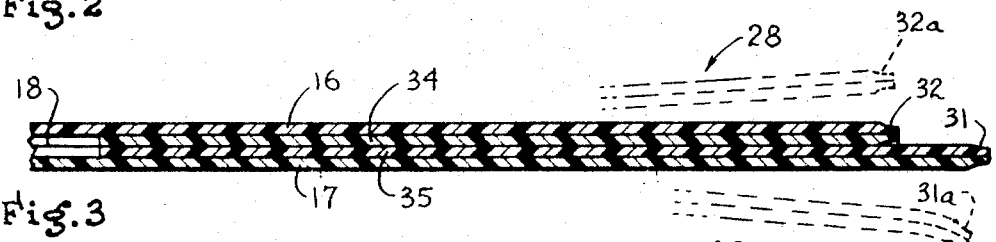
Fig. 3
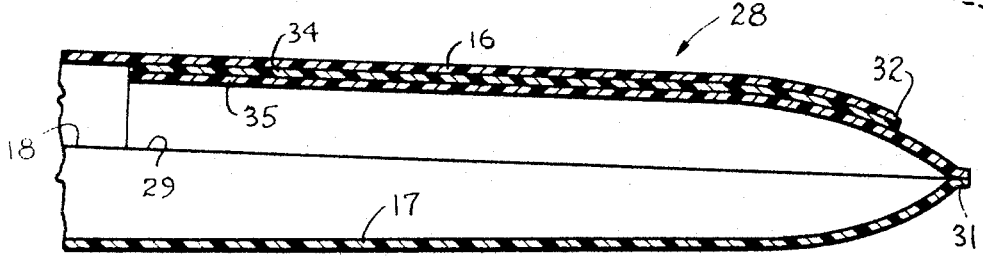
Fig. 4
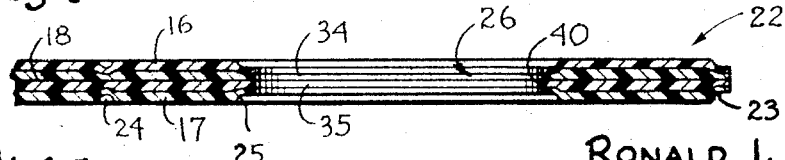
Fig. 5
INVENTOR.
RONALD L. VOLLER
BY Fidler, Bradley,
Patnaude & Petherbridge
ATTYS.

3,461,015
METHOD FOR FORMING A FLEXIBLE PLASTIC BAG HAVING AN INTEGRAL VALVE
Ronald L. Voller, 7043 W. Monroe St., Niles, Ill. 60648
Original application Dec. 2, 1963, Ser. No. 327,401, now Patent No. 3,332,420, dated July 25, 1967. Divided and this application June 19, 1967, Ser. No. 660,537
Int. Cl. B32b *31/00*
U.S. Cl. 156—306           3 Claims

ABSTRACT OF THE DISCLOSURE

A process and apparatus for fabricating valved enema bags. The process comprising forming a flexible bag with a self-closing inlet to which is secured an elongated tubular outlet providing an essentially unitary bag and outlet structure. The apparatus employed in the method consists of heat sealing devices for sealing portions of the bag and a tool for bonding the tubular outlet to the resilient bag to form a unitary structure.

---

The present invention relates to a new article of manufacture and method of making same; and more particularly, to a disposable pressurized-fluid bag, including a one-way valve fabricated in a new manner, and an outlet connection for draining the bag attached therewith by a new method of manufacture and including new mechanism for fabricating same.

This application is a division of applicant's application Ser. No. 327,401, Dec. 2, 1963, now U.S. Patent 3,332,420, which issued July 25, 1967, for "Valved Enema Bag Made From Materials Having Different Surface Affinities."

The particular article of manufacture comprises a medical appliance in the form of a fluid bag which is adapted for the administering of enemas, and the like, in hospitals to patients, and is disposable after use. The article is characterized in that it is economical of manufacture, and the method and apparatus for manufacturing same to be pointed out more in detail below. The article includes an inlet check valve, or the like, through which the bag may be filled with a suitable solution for application to a patient. The check valve will prevent leakage from the bag at the filling end thereof and the bag can be laid adjacent the patient on a bed or chair, or the like, and a catheter formed on the end of a tube for injecting the medication fluid inserted into the body of a patient.

In applying an enema, for example, there may be other appliances and receptacles present, and it is a particular advantage of the present invention that the bag can be laid adjacent the patient while the attendant positions the catheter end and other equipment.

An additional feature and advantage of the present invention is that the catheter end thereof may be perforated in such manner as to permit only a low volume of flow therethrough during a given period of time. With such structure, the catheter may be inserted into the body of the patient and the bag itself laid beneath the patient and the pressure of the patient's body will force the liquid into the patient's body. The medicine will be kept at body temperature by being adjacent the patient's body during this long-time application of the medication.

The device is further characterized in being formed in a relatively few number of operations for heat sealing different subassemblies of the same and thereafter assembling the subassemblies for completing an inlet check valve. The device has a further advantage in being sealed with a drainage tube in a new manner and in a new machine whereby the completed bag can be attached to a drainage tube of a suitable plastic which is heat sealable with relationship to the plastic material comprising the walls of the bag adjacent the point of attachment to the tube.

Accordingly, it is a primary object of this invention to provide a disposable pressurizable plastic appliance, and a method for making same.

A further object of the invention is to provide an appliance with a check valve comprising edges that are heat sealable and co-operating edges which are not sealed whereby to form a valve within a housing therefor.

A further object in keeping with either of the above objects is to provide a plastic appliance having a tube attached to the appliance in a new method in a new machine.

A further object is to provide a new method for attaching plastic sheet material to a tube for sealing same for containment of fluids.

Another object in keeping with each of the preceding objects is to provide a new pressurizable medical appliance for administering medication under pressure for predetermined variable periods of time and/or at a patient's body temperature.

The foregoing and other objects and advantages of the invention will be either obvious or pointed out in the following specification and claims read in view of the accompanying drawings in which:

FIG. 1 is a view of the article of manufacture in position for use; and is shown expanded and containing a fluid;

FIG. 2 is a side view of the article;

FIG. 3 is a view taken along the lines 3—3 of FIG. 2;

FIG. 4 is a view similar to FIG. 3 but showing the check valve in position for retaining a fluid within the article;

FIG. 5 is a view taken along lines 5—5 of FIG. 2 showing the handle portion of the article;

FIG. 6 is an enlarged view taken on lines 6—6 of FIG. 2;

FIG. 7 is a view of apparatus for forming the seal disclosed in detail in FIG. 6 in open position and plastic parts in place prior to assembly;

FIG. 8 is a view similar to FIG. 7 showing the tube and sheet assembly at completion of the sealing operation; and FIG. 9 is a diagram of electrical pulses used for sealing a tube to the article.

Referring now in detail to the drawing and first to FIG. 1, a medical bag 10 which may be filled with a suitable fluid is attached to an outlet tube 11 having its end shown enlarged for clarity, rounded to form a catheter 12 in which a hole 15 of suitable predetermined flow capacity is formed. The catheter 12 may be inserted into a patient while the bag 10 rests on a surface 14 of a bed or an adjacent chair or table. With this construction so long as the catheter 12 is above the level of the top of the bag 10 there will be no leakage out of the catheter 12. It is also contemplated in this invention that a body temperature solvent wax, or the like, be inserted into the openings 15 in the catheter to prevent leakage until the appliance is put into use and the wax melts due to body temperature of the patient.

Referring now to FIGS. 2–5, a side view of the article 10 is shown, FIG. 2, and it comprises a pair of bag forming sheets 16 and 17 which are secured together by heat seals 18 at the top of the view, 19 at the left end and at 20 at the bottom to form a pressurizable bag portion of the article. A handle portion 22 is formed by a heat seal 23, a heat seal 24, and a heat seal 25 surrounding perforations 26, FIG. 5, through all of the sheets of plastic material. A valve forming portion 28 of the bag 10 is shown at the right upper side of FIG. 2 and comprise heat sealed valve edge seams 29 and 30 at the upper and lower sides of the valve portion 28. An end seal, also forming a valve opening, is provided by a seal 31 and a seal 32 associated with the sheets 17 and 16, respectively.

A check valve is made up of a pair of substantially similarly shaped sheets of material 34 and 35. As shown, the sheet 34 is connected at its right-hand edge to the heat seal edge 32 of the sheet 16. The lower valve part 35 is connected by the heat seal edge 31 to the sheet 17. All four sheets of material are thereafter, in a secondary step in the method of fabricating the article, heat sealed along edge seams 29 and 30, forming the inlet check valve 28 for the article 10. As indicated in FIG. 2, the heat seal end 31 can be moved to the dotted position 31a by the fingers of a user to separate same substantially from the heat sealed end shown in dotted position 32a whereby the bag may be filled with medication.

It is to be noted that the heat seals 31 and 32 are spaced slightly from each other so that the parts forming the bag are not identical. It is not essential that they be so formed and the parts can be identical, and in such case the seams 31 and 32 will be in registry. However, such bags are not as easy to open as the presently disclosed bag; and the plastic material used preferably has a suitable surface affinity to keep the same closed until manually opened for use.

Referring to FIG. 4, the check valve portion 28 is shown substantially enlarged and expanded as same will be when filled with fluid in a predetermined amount as indicated by cubic centimeter indicia 38, FIG. 2. The valve forming sheets 34 and 35 are normally urged together by affinity, as well as by the very nominal pressure of fluid inside of the bag. The bag can resist substantial pressure, such as by being placed under the body of a patient, for example, for administering medication over a long period of time as mentioned briefly above; and as can be accomplished by providing a small capacity orifice 15 in the catheter 12, FIG. 1.

At least the check valve forming sheets 34 and 35 are made of a suitable plastic having surface affinity. By way of example, polyvinyl chloride plastic of substantially 14-gauge thickness has been used successfully in fabricating a valve of the kind herein disclosed. The material forming the valve parts 34 and 35 is preferably of that type having a smooth, or shiny, side and a relatively rougher, or dull, side. The shiny sides have a greater affinity to each other and there is a tendency of the shiny sides to cohere or to stick together, as mentioned briefly above. The dull sides do not exhibit this cohesion characteristic to as great an extent as the shiny sides.

In the arrangement of parts, the mating surfaces between the valve forming parts 34 and 35 are the shiny sides of the material. The interior surfaces of the bag forming sheets 16 and 17 may be the dull sides of thicker material, for example 8-gauge polyvinyl chloride. Accordingly, there will be less tendency for the valve parts to stick to the bag parts than the tendency of the valve parts 34 and 35 to stick to each other. Such plastics are commercially available from Somers Plastic Company, Industrial Park, N.J., under the catalog listing "German Roller Patent." However, other plastics of similar nature having shiny and dull sides with the shiny side having a greater surface affinity than the dull side are deemed suitable for fabrication of the bag and the valve.

Referring in detail to FIG. 5, the handle portion 22 is shown in section and shows the four layers of material 16, 17, 34 and 35 having substantially identical pierced out portions 26 which are sized to receive two or three fingers of a user. It is to be noted that the high point 40 of the hole 26 is located so that, if same is placed on a hook, the bag will extend substantialy vertically to completely drain the contents of same out through the tube 11. In certain operations, it is desired that the bag be so suspended at different heights to best facilitate emptying of the contents of the bag due to the force of gravity through the catheter 15. It is to be understood, however, that if the bag contains medication in the form of gas, manual pressure is applied to the surfaces of the bag to force the gas out of the orifice 15 in the catheter 12.

The article 10 is preferably fabricated in the following manner. A sheet of material 16 is sealed at the edge 32 with a valve forming sheet 34 as a first step in the fabrication operation. The second sheet 17 is sealed at the edge 31 with the second valve forming sheet 35. The parts are laid over each other with identical parts in registry and the heat seal seams 18, 19, 20, 23, 24, 25, 29 and 30 are made in a single die to complete the assembly of the bag and the inlet check valve portion of the article. Thereafter, the other end of the bag 10 is placed adjacent the end of the tube 11, a tool pierces a hole 42 in the end of the bag, and these parts are pressed and sealed together by a process to be explained below. The resultant article of manufacture comprises a bag having two openings, one being a filling opening in the form of an inlet check valve 28, and the other being an outlet opening comprising a connection to a tube 11 for draining the bag.

The bag thus fabricated is made of relatively inexpensive parts and is readily fabricated in equipment capable of producing high quantities and, accordingly, the resultant cost of the bag is such that the same may be disposable. Accordingly, the pressurizable bag can be used for the treatment of but a single patient and may be disposed of after treatment of the patient, rather than as in presenly practiced conventional measures involving sterilization, and the like, which are expensive and time-consuming. It is not required, however, that an article 10 be disposed after each use but may be used several different times by a single patient.

Tube and sheet seal method and apparatus

Referring to FIG. 6, the tube 11 is shown secured to a portion of the article 10 around the outside surface of the hole 42 in the sheet material 44 and the internal flared surface of the tube 11. An internal flared end 45 of the tube 11 is shown as expanded to approximately a forty-five degree angle in which position the contacting surface 42 will have been elongated and the cross-section of the tube will become relatively thinner walled at the end 45a than the normal wall thickness of the tube 11. Similarly, the hole 42 in the sheet 44 will be stretched, elongated and compressed, and there will be relative motion and increase of area along the surface 44 during such elongation. Heat caused by magnetic excitation and tool pressure shapes the conical surface 45 to create a strong and intimate fluid-tight seal at the surfaces 42 and 45.

Referring to FIG. 7, a pair of mating magnetically conductive dies 50 and 51 are shown. The die 51 is suitably connected to a plunger 52 driven by a hydraulic motor 54 which can reciprocate the die 50 downwardly to the position shown in FIG. 8 and back up to the position shown in FIG. 7 for each sealing operation of the tube 11 with the sheet material 44 of the article 10 shown in dotted lines. In the position shown in FIG. 7, the tube 11 is placed in a semicircular cross-section transverse groove 56 in the upper surface of the die 51, and a similar semicircular transverse groove 57 in the upper die 50 mates with the groove 56 to secure the tube 11 frictionally therebetween with the end 45 extending a predetermined distance into a forty-five degree angled conical recess portions 59 and 60 in the upper and lower dies 50 and 51, respectively. The hole 42 is pierced in the end of the sheet material 46 and placed in alignment with the end 45 of the tube 11 by the end of a plunger 62 on the end of a nonmagnetic mandrel 63. The plunger 62 can be made of a phenolic, for example. The mandrel 63 is formed of magnetic material and is forced down until a shoulder 67 presses the tube end 45 and flares the same substantially to the position shown in FIG. 6. There will be a small flux gap 70 through the materials 42 and 45.

Referring now to FIG. 8, the magnetic flux conducting dies 50 and 51 are in intimate engagement with each other to provide an ample path for flux to the conical surfaces 59 and 60. The magnetic mandrel 63 is positioned as shown and has a surface 72 adjacent a pole 74 of an electromagnet 75. The electromagnet 75 has another pole 76 in magnetic circuitry with the lower die 51 which is in turn magnetically associated with the upper die 50 as noted above. A magnetic coil 78 is energized through wires 79 from a D.C. and R.F. source 80 which may be suitably powered by line wires 82. Under D.C. current influence through the wires 79 the coil 78 will polarize the field so that the flux across the gap 70 will be in one direction only. During R.F. excitation of the winding 78, there will be R.F. frequency magnetic oscillations in the gap 70.

Certain vinyl plastics, of which the article 10 and the tube 11 are fabricated, have the property of having their molecular domains normally at random magnetic polarity. In the presence of a magnetic field, the materials of the article 10 and tube 11 will become aligned across the flux gap 70 and polarized with respect to each other. This period of operation is represented by a direct current bias 85, FIG. 9, above a line 86 of zero potential.

After predetermined time of polarization of the domains and the molecular structure of the contacting surfaces 42 and 45 of the article 10 and tube 11 respectively, a radio frequency of substantially 27 megacycles is applied across the gap 70 through the magnetic circuit from the pole 74 and 76 to the magnetic parts 70, 71 and 72, respectively, of the dies 50 and 51, and the mandrel 63. The R.F. current is indicated by traces 88, FIG. 9, and is continued for a time suitable for heating the plastic in the flux gap 70. Different thicknesses of plastic will require different lengths of time of radio frequency oscillation in order to achieve the final desirable sealing. It is also to be noted that the materials are heated by the R.F. current.

After the materials in the flux gap 70 have attained a proper heat and intimacy due to magnetic excitation, the magnetic field is again rendered D.C. as represented by the trace 90 in FIG. 9 to realign the magnetic domains. Upon realigning the domains, the materials 42 and 45 will form a weld. Upon return of the D.C. current to zero potential along the line 86, the domains will return to random status and the line of weld between the materials 42 and 45 will be achieved. The dies and mandrel are removed to free the article.

While I have shown and described in detail a presently preferred embodiment of this invention including an article and apparatus and method for fabricating same, obviously other modifications hereof will occur to others working in the art. Accordingly, I wish to be limited in my invention only by the scope of the following claims.

I claim:

1. A method for forming a flexible plastic bag adapted to contain a fluid and having an integrally formed valve comprising the steps of: forming a bag structure having walls defining a fluid confining chamber; providing a fluid outlet in the bag structure establishing communication between the fluid chamber and the atmosphere on the exterior of the bag structure to provide a means for discharging fluid from the chamber; forming a fluid inlet neck portion in the bag structure for establishing communication between the chamber and the bag exterior to provide a means for introducing fluid into the fluid chamber, the inlet neck portion having a substantially continuous outer peripheral edge forming the interior surfaces of the wall portions of the bag structure bordering the fluid inlet neck with a relatively non-adherent finish; and forming valve means in the neck portion of the bag to prevent the discharge of fluid introduced into the chamber of the bag structure from the inlet neck portion, the valve means being formed by sealing the peripheral edge of a first generally adherent plastic sheet to the peripheral edge of the inlet neck portion and extending the remainder of the sheet into the inlet neck portion of the bag structure, sealing the peripheral edge of a second generally adherent plastic sheet to the peripheral edge of the inlet neck portion adjacent the first sheet and in substantially opposed relationship therewith and extending the remainder of the sheet into the inlet neck portion of the bag structure, the sheets being disposed substantially opposite each other across the inlet neck portion of the bag structure, sealing at least a portion of the sheet edge portions extending inwardly from the edges sealed to the outer peripheral edge of the neck portion to the neck portion, the generally adherent sheets providing a closable passage therebetween from the bag exterior to the fluid confining chamber whereby the opposed adherent sheet surfaces adhere to each other preventing discharge of fluid from the inlet of the bag structure and whereby fluid may pass between at least one of the adherent sheets and the adjacent non-adherent neck portion of the bag structure to further enhance the closure provided initially by the adherent sheet surfaces.

2. The method of claim 1 wherein an elongated hollow plastic tube is sealed to the fluid outlet of the bag structure in communication with the fluid confining chamber to provide the bag structure with a tubular discharge outlet.

3. The method of claim 1 wherein the surface of the neck portion of the bag structure is formed from a plastic material having a dull finish and the first and second sheets are formed from a material having a generally shiny finish with surface affinity of the shiny sheets exceeding that of the dull portions to enhance valve closure.

References Cited

UNITED STATES PATENTS

| 3,006,257 | 10/1961 | Orsini | 156—306 |
| 3,230,663 | 1/1966 | Shabram | 156—515 |

DOUGLAS J. DRUMMOND, Primary Examiner